(12) United States Patent
Garcia et al.

(10) Patent No.: US 10,634,280 B2
(45) Date of Patent: Apr. 28, 2020

(54) SPRING LOADED ACCESSORY HUB

(71) Applicant: Spectrum Brands, Inc., Middleton, WI (US)

(72) Inventors: Roberto Garcia, Buena Park, CA (US); Jan Van Leyen, Irvine, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 15/939,961

(22) Filed: Mar. 29, 2018

(65) Prior Publication Data

US 2018/0283604 A1 Oct. 4, 2018

Related U.S. Application Data

(60) Provisional application No. 62/480,829, filed on Apr. 3, 2017.

(51) Int. Cl.
| | |
|---|---|
| *F16M 13/00* | (2006.01) |
| *F16M 13/02* | (2006.01) |
| *A47G 25/06* | (2006.01) |
| *A47K 10/04* | (2006.01) |
| *A47K 10/10* | (2006.01) |
| *F16B 21/12* | (2006.01) |

(52) U.S. Cl.
CPC ......... *F16M 13/02* (2013.01); *A47G 25/0607* (2013.01); *A47G 25/0635* (2013.01); *A47K 10/04* (2013.01); *A47K 10/10* (2013.01); *F16B 21/125* (2013.01)

(58) Field of Classification Search
CPC ............................... F16M 11/00; F16M 13/00
USPC ............ 248/220.21, 220.22, 222.11, 222.12, 248/346.04
See application file for complete search history.

(56) References Cited

U.S. PATENT DOCUMENTS

| | | | |
|---|---|---|---|
| 3,063,803 A | 5/1962 | Fiebelkorn | |
| 4,718,625 A * | 1/1988 | Boda | A47K 10/10 248/222.11 |
| 6,029,940 A * | 2/2000 | Klein | A47B 81/06 248/222.12 |
| 6,609,679 B1 * | 8/2003 | Seidel | F16B 2/14 244/1 R |

(Continued)

FOREIGN PATENT DOCUMENTS

| | | |
|---|---|---|
| AT | 255070 B | 6/1967 |
| CN | 104224012 A | 12/2014 |
| DE | 299 20 923 U1 | 4/2000 |

OTHER PUBLICATIONS

International Search Report and Written Opinion for Application No. PCT/US2018/025678 dated Jul. 6, 2018.

*Primary Examiner* — Steven M Marsh
(74) *Attorney, Agent, or Firm* — Merchant & Gould P.C.

(57) ABSTRACT

An accessory hub joins accessories such as towel bars and robe hooks to a wall. In order to attach the accessory to the wall, a collet is fastened to the wall. The accessory hub may be joined to the collet with a spring-loaded button extending from the collet that is inserted into a receiver in the accessory hub. A first cleat portion on the collet mates with a second cleat portion on the accessory hub further securing the accessory hub to the collet. The accessory may then be attached to the accessory hub. The accessory hub may be detached from the collet without damaging the wall by depressing the button into the collet and disengaging the first and second cleat portions.

17 Claims, 7 Drawing Sheets

(56) References Cited

U.S. PATENT DOCUMENTS

| | | | | |
|---|---|---|---|---|
| 8,585,337 B1 * | 11/2013 | Dang | .................... | H01R 13/74 |
| | | | | 411/347 |
| 9,903,512 B2 * | 2/2018 | Sixsmith | ................... | F16L 3/24 |
| 2013/0048811 A1 * | 2/2013 | Tseng | .................... | F16M 11/10 |
| | | | | 248/220.21 |

* cited by examiner

SPRING LOADED ACCESSORY HUB

CROSS REFERENCE TO RELATED APPLICATIONS

This application claims priority to U.S. Provisional Application Ser. No. 62/480,829 filed Apr. 3, 2017, the entire contents of which are expressly incorporated herein by reference.

TECHNICAL FIELD

The invention is related to the field bathroom accessory devices. More particularly, the invention is related to the field of bathroom accessory attachment devices.

BACKGROUND OF THE INVENTION

Existing accessory mounting systems typically use drywall anchors to mount the accessory device to a wall. Removal of the accessory devices requires a large force to remove the accessory hub from the wall mount. This removal process often causes drywall anchors to strip thereby leaving a stripped hole in the wall, which makes mounting another accessory to the wall difficult and leaves the subsequent installation loosely attached to the wall.

What is therefore needed is an accessory mounting device that is easily attached to a wall and also easily removed. Further, what is needed is an accessory attachment device that may be removed without significant force which is known to cause damage to plasterboard walls.

SUMMARY AND OBJECT OF THE INVENTION

An accessory mounting device attaches an accessory hub to a wall. The mounting device includes an accessory hub with a plurality of sides and a rear portion. The rear portion of the accessory hub has an open and hollow recess with a first cleat portion. The first cleat portion provides a mount to secure the accessory hub to the wall. In order to attach the first cleat portion to a wall, a collet is first attached to the wall. The collet includes a first mounting tab and a second mounting tab, each with a hole. A fastener is placed through each hole to attach the collet to the wall. The collet may then be inserted into, or covered-up, by the open and hollow recess of the accessory hub. The tip of the first mounting tab also forms a second cleat portion that engages the first cleat portion of the accessory hub. Any downward motion of the accessory hub is therefore prevented once the first cleat portion and the second cleat portion are engaged.

A button is also included with the body of the collet. The button can slide along an internal bore within the body. The button is displaceable from a home position where it extends from the body of the collet to a displaced position where the button is displaced into the bore and body of the collet. The button may be displaced with a manual depression and automatically returned to the home position following termination of the manual depression by a spring within a bore of the body of the collet. A spring retainer threads into the bore and prevents both the spring and the button from falling out of the bore of the collet.

The accessory hub may include an optional hole in one of the plurality of sides of the accessory hub allowing the button to be at least partially accessible through the hole. The accessory hub may be removed from the collet by depressing the button and disengaging the first cleat portion from the second cleat portion. Similarly, the accessory hub may be retained by the collet when the button depressed to the displaced position and the first cleat portion is engaged with the second cleat portion and the button is released to the home position and into the hole through the side of the accessory hub, thereby protruding through the hole. The first cleat portion and the second cleat portion work in tandem to prevent the accessory hub from being detached from the collet, which is secured to the wall by a fastener.

The accessory hub receives a plurality of accessories including at least one of a towel bar, a towel ring, a soap tray, a tissue holder, a tumbler holder, and a robe hook. The accessory hub is interchangeable with any one of the accessories.

BRIEF DESCRIPTION OF THE DRAWINGS

The present disclosure will be described hereafter with reference to the attached drawings which are given as non-limiting examples only, in which:

FIG. 4 shows a side view of the accessory hub of FIG. 1 along section line AA shown in

FIG. 5 shows a bottom-perspective view of the accessory hub of FIG. 1, revealing the underside of the accessory hub;

Figure 1:
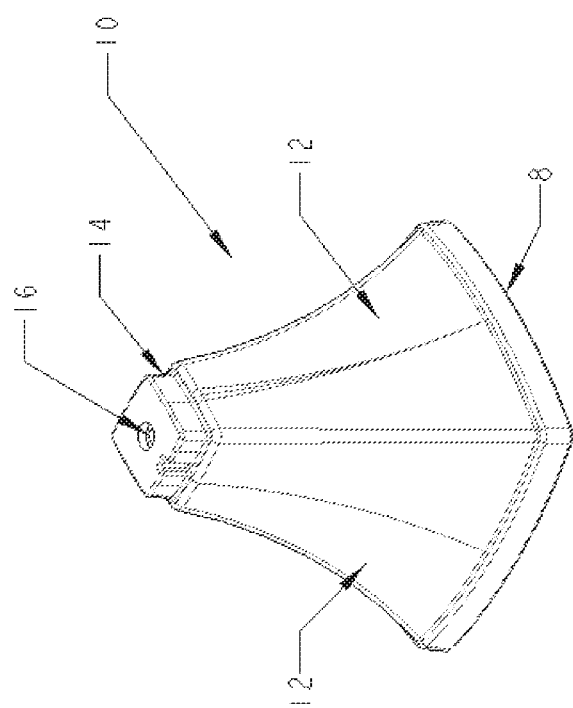
FIG. 1 shows a top-perspective view of an accessory hub according to the invention.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Corresponding reference characters in the drawings indicate corresponding parts throughout the several views. The exemplification set out herein illustrates embodiments of the invention, and such exemplification is not to be construed as limiting the scope of the invention in any manner.

DETAILED DESCRIPTION

FIG. 1 shows the accessory hub 10. The accessory hub 10 includes sides 12 extending from foundation 8. The sides 12 taper from the foundation 8 up to the extension 14. The extension 14 includes a mount 16. The mount 16 can accept a fastener for attachment to an accessory such as a towel bar, tissue holder, tumbler holder, towel ring, robe hook, or the like. Multiple accessory hubs 10 may also be used for larger accessories. The accessory hub 10 may also be shaped in any other shape, such as spherical, rectangular, or the like, without departing from the spirit of the invention.

Figure 2:
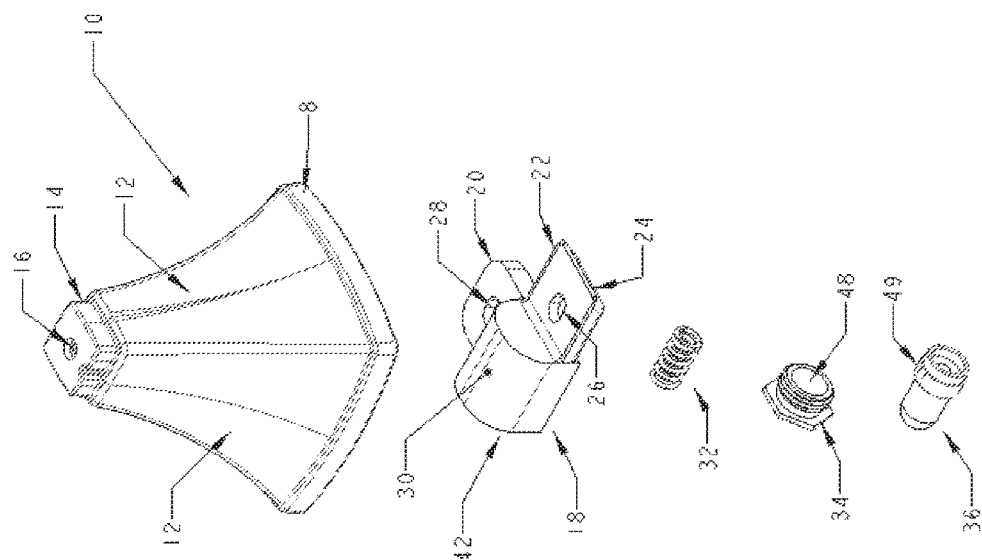
FIG. 2 shows a perspective, exploded view of the accessory hub of FIG. 1 showing the collet, spring, button, and spring retainer.

The invention is best shown in FIG. 2 which is an exploded view of the accessory hub 10. The collet 18 includes a first mounting tab 22 and a second mounting tab 20. Each mounting tab includes a hole 28, 26 that accepts a fastener. The fastener secures the collet 18 to a wall and forms the anchor point for the accessory hub 10. Preferably, the first mounting tab 22 is placed vertically and pointing upwards with the first cleat portion 24 oriented upwards along the wall. The first cleat portion 24 mates with a second cleat portion 38 within the accessory hub 10, best shown in FIG. 5. The first cleat portion 24, along with a button 36 effectively retain the accessory hub 10 mounted to a wall.

The button 36 may be depressed into the body 30 of the collet 18. A spring 32 within the body 30 maintains a force on the button 36 that returns it to a home position once it is depressed. During assembly of the collet, the spring is inserted into the body through a bore 43, best shown in FIG. 6, the button 36 is then inserted into the bore 43. The bore 43 is a blind hole, in that it does not go completely through the body 30 of the collet 18. As a result, the spring 32 bottoms out within the bore 43. The spring retainer 34 is then fastened to the bore and retains the spring and the button 36 within the bore 43. A through hole 48 allows the button 36 to extend out of the bore 43. A shoulder 49 has a larger diameter than the rest of the button 36. The shoulder 49 therefore contacts the spring retainer and prevents the button 36 from exiting the bore 43. The button 36 can be depressed with a manual force to push it into the bore 43. Once the manual depression is removed, the spring will urge the button 36 back out of the bore 43. When the button 36 is protruding from the bore 43 it is in the home position. When the button 36 is depressed further into the bore 43 thereby compressing the spring 32 it is in the depressed position.

Figure 3:
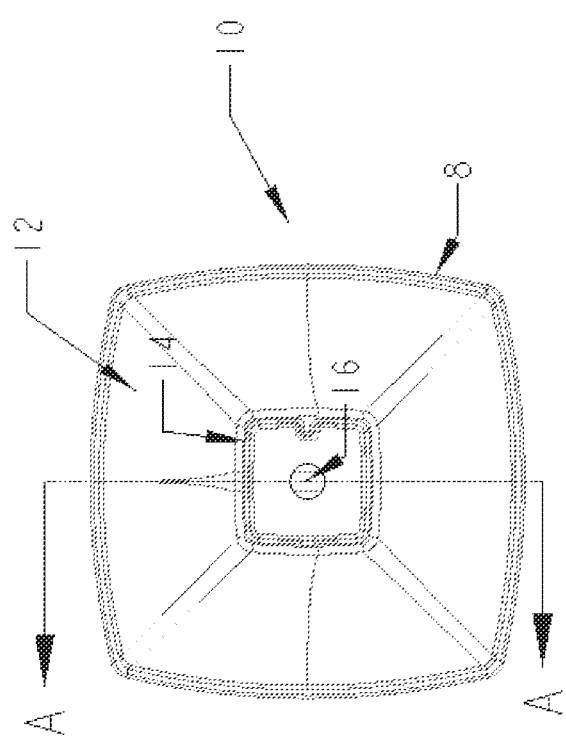
FIG. 3 shows a top view of the accessory hub of FIG. 1 with the section line AA.
Figure 4:
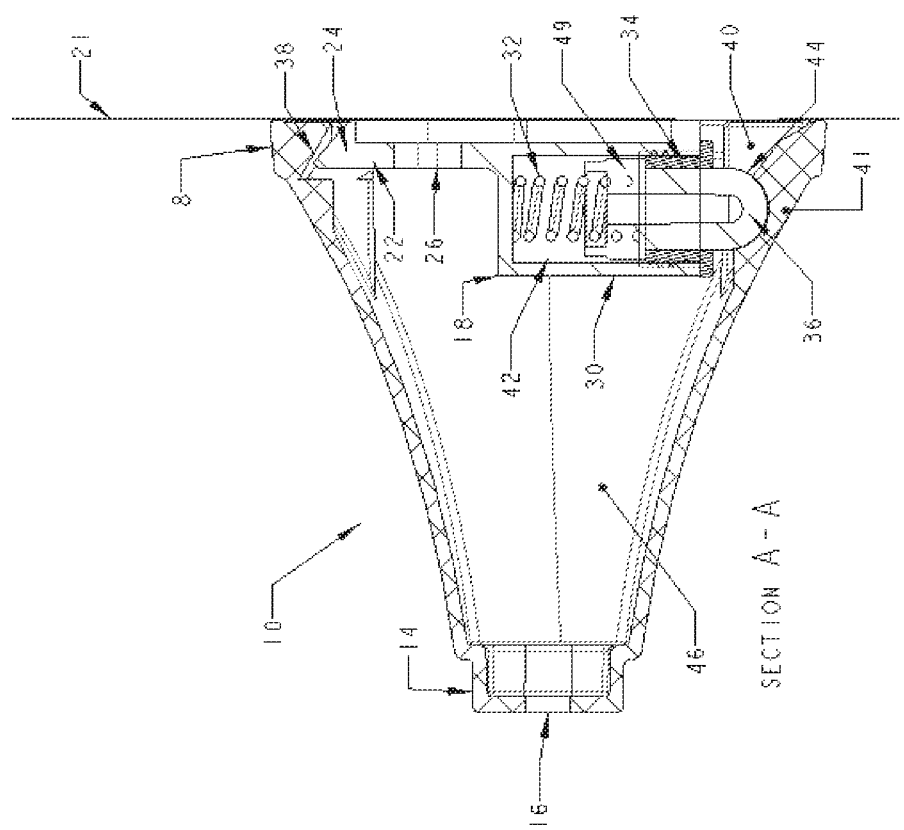

The button 36 is best shown installed in FIG. 4, which is a sectional view along section line AA, as seen in FIG. 3. FIG. 4 shows the accessory hub 10 and exposes the recess 46. In this view, the collet 18 is secured to a wall 21 with fasteners (not shown) inserted through the hole 26 in the first mounting tab 22. Once the collet 18 is fastened to the wall 21, the accessory hub 10 is attached to the collet 18 by first placing the first cleat portion 24 of the first mounting tab 22 against the second cleat portion 38 of the accessory hub 10. The second cleat portion 38 is formed within the recess 46 along the foundation 8. The second cleat portion 38 is angled to match the angle formed by the first cleat portion 24. The angled portions form a connection that prevents a downward motion of the accessory hub 10 thereby holding it in place.

To prevent the lower part of the accessory hub 10 from separating from the wall 21, the button 36 extends into a receiver 44. A ramp 40 displaces the button from the home position, which is extended, to the depressed position within the bore 43. This is done by first joining the first cleat portion 24 to the second cleat portion 38 and then pivoting the ramp 40 and receiver 44 towards the button 36, while maintaining the first cleat portion 24 and second cleat portion 38 in contact. Once the button contacts the ramp 40, the angle of the ramp 40 urges the button 36 into the bore 43 compressing the spring 32. Once the foundation 8 of the accessory hub 10 is flush against the wall 21, the button 36 extends back to the extended, home position and into the receiver 44. The button 36, receiver 44, first cleat portion 24, and second cleat portion 38 all work together to retain the foundation 8 of the accessory hub 10 against the wall 21.

When removal of the accessory hub 10 from the wall 21 is desired, the button 36 may be depressed into the bore 43 through an access hole 41. The accessory hub 10 may then be pivoted away from the wall 21 by separating the ramp 40 away from the wall 21. The second cleat portion 38 may then be lifted vertically away from the first cleat portion 24. It is also foreseen that the accessory hub 10 may be attached to the collet 18 and detached from the collet 18 without an access hole 41. In such a configuration, a sharp pivoting action of the accessory hub 10 pulling the accessory ramp 40 away from the wall 21 can cause the button 36 to automatically retract into the bore 43. Such a configuration would function much like a ball catch or a roller catch for a door latch. The spring retainer 34 may also be adjusted to increase or decrease the compression of the spring 32 to adjust the amount of force needed to seat the button 36 into the receiver 44 and to remove the button 36 from the receiver 44.

Figure 5:
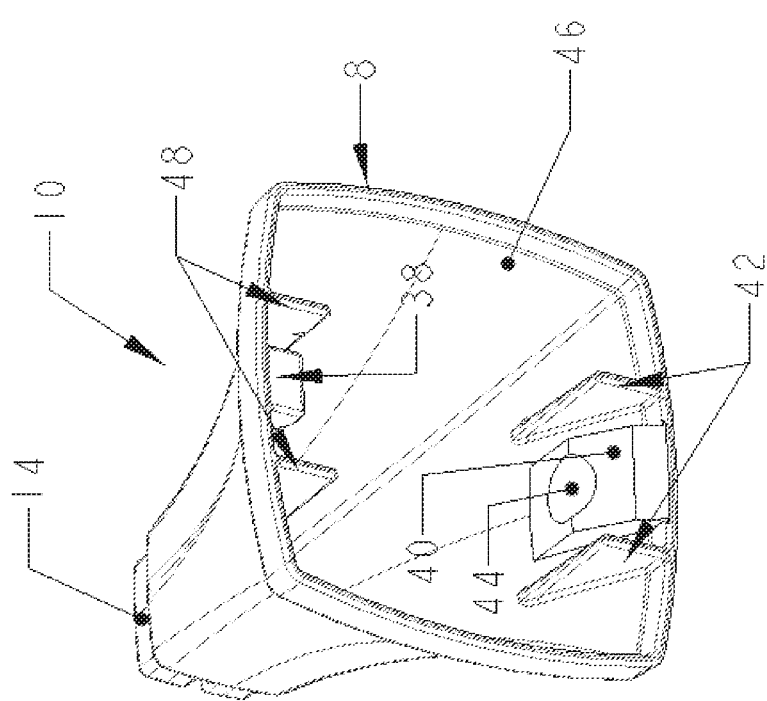
FIG. 5.

FIG. 5 shows the under-side of accessory hub 10 where the recess 46 is clearly shown. The second cleat portion 38 is seen extending from the foundation 8 and into the recess 46. A pair of guides 48 also extend alongside the second cleat portion 38 and ensures proper alignment when a user is attaching the accessory hub 10 to the collet 18 as shown in FIG. 4 for reference. Opposite the second cleat portion 38, the receiver 44 receives the button 36 as shown in FIG. 4. The ramp 40 helps move the button 36 from the home position to the depressed position as the accessory hub is mounted to the collet 18. The button 36 may then insert itself into the receiver 44. A pair of guides 42 on the sides of the ramp 40 assists the user with proper alignment when the accessory hub 10 is being attached to the collet 18.

Figure 6:
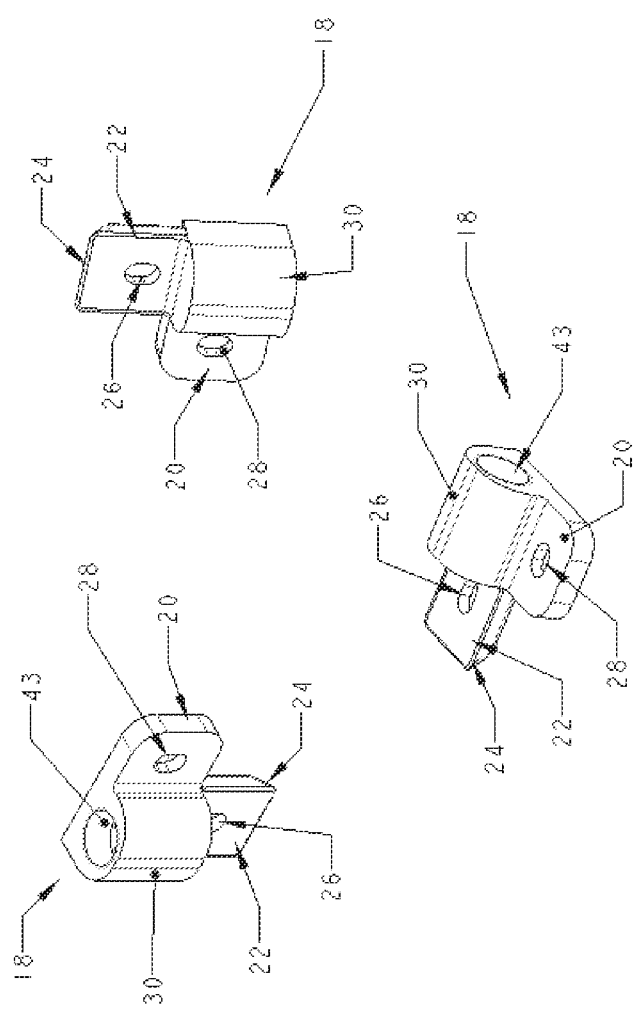
FIG. 6 shows multiple, top and side perspective views of the collet of FIG. 2.

With respect to FIG. 6, it shows the collet 18 is shown from multiple vantage points. As previously discussed, the collet 18 has a bore 43 that accepts the button 36. The collet 18 has a first mounting tab 22 and a second mounting tab 20 extending from the body 30 at right angles from one another. The collet 18 could have additional mounting tabs or the mounting tabs could be shaped differently. The first mounting tab 22 includes the first cleat portion 24 which mates with the second cleat portion 38 of the accessory hub 10 as shown in FIG. 4. Once the button 36 is inserted into the bore 43, fasteners are placed through the holes 26, 28 thereby securing the first mounting tab 22 and second mounting tab 20 to the wall 21 (see FIG. 4), and the first cleat portion 24 is mated with the second cleat portion 38, the collet 18 secures the accessory hub 10 against the wall against forces in all axes.

Figure 7:
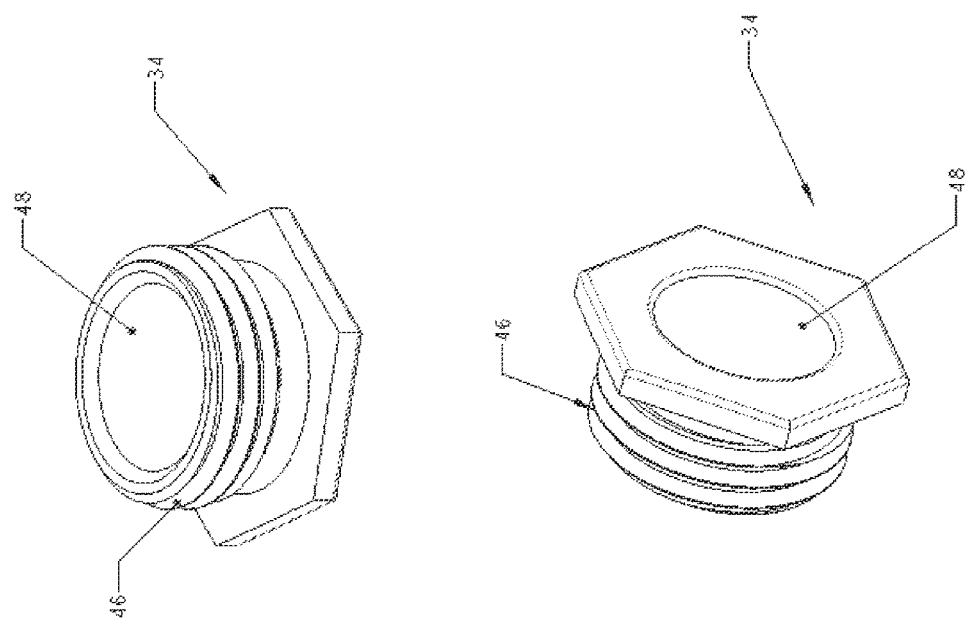
FIG. 7 shows multiple perspective views of the spring retainer of FIG. 2.

FIG. 7 shows detailed views of the spring retainer 34, also shown in FIGS. 2 and 4. The spring retainer includes threads 46 which engage matching threads in the bore 43 of the collet 18. The threads 46 allow the spring retainer 34 to be adjusted with respect to its position within the bore 43. The adjustability allows a user to change how much force is necessary to displace the button 36 along the ramp 40 when engaging the button 36 with the retainer 44 (see FIG. 4). The button 36 protrudes through the through hole 48. A shoulder 49 on the button 36 contacts the spring retainer 34 and prevents the button 36 from exiting the bore 43 through the through hole 48 in the spring retainer 34.

We claim:

1. An accessory mounting device comprising:
   an accessory hub with a plurality of sides and a rear portion;
   an open and hollow recess in the rear portion, wherein the open and hollow recess includes a first cleat portion for securing the accessory hub to a wall;
   a collet with a first mounting tab received in the open and hollow recess;
   a second cleat portion formed on the first mounting tab of the collet configured to engage the first cleat portion thereby preventing downward motion of the accessory hub once engaged;

a button within the collet displaceable to a home position and a displaced position, wherein the button is configured to be displaced from the home position to the displaced position with a manual depression and automatically returned to the home position following termination of the manual depression by a spring within the collet seated within a bore of a blind hole of the collet; and a hole in one of the plurality of sides of the accessory hub, wherein the button is at least partially accessible through the hole;

wherein the accessory hub is removed from the collet by depressing the button and disengaging the first cleat portion from the second cleat portion, and wherein the accessory hub is retained by the collet when the button is depressed to the displaced position, the first cleat portion is engaged with the second cleat portion, and the button is released to the home position thereby protruding through the hole in one of the plurality of sides.

2. The accessory mounting device according to claim 1, further comprising a second mounting tab extending from the collet at a right angle from the collet with respect to the first mounting tab, wherein at least one of the first mounting tab and the second mounting tab has a through hole configured to receive a fastener thereby securing the collet to the wall.

3. The accessory mounting device according to claim 1, further comprising:

a spring retainer inserted into the bore configured to retain the spring and button within the bore, wherein the spring retainer engages the bore with a threaded engagement.

4. The accessory mounting device according to claim 1, wherein the accessory hub is configured to receive a plurality of accessories including at least one of a towel bar, a towel ring, a soap tray, a tissue holder, a tumbler holder, and a robe hook.

5. The accessory mounting device according to claim 4, wherein the accessory hub is interchangeable with any one of the accessories.

6. An accessory mounting device comprising:

an accessory hub with a plurality of sides and a rear portion;

an open and hollow recess in the rear portion;

a collet with at least one mounting tab received in the open and hollow recess, wherein the collet includes a bore forming a blind hole configured to receive a spring;

a spring retainer configured to retain the spring within the bore;

a movable button extending from the collet with a home position and a displaced position, wherein the button is configured to be displaced from the home position to the displaced position with a manual depression and automatically returned to the home position following termination of the manual depression by the spring; and a hole in one of the plurality of sides of the accessory hub, wherein the button is at least partially accessible through the hole.

7. The accessory mounting device according to claim 6, wherein the accessory hub is removed from the collet by depressing the button and wherein the accessory hub is retained by the collet when A) the button is depressed to the displaced position, B) the collet is inserted into the open and hollow recess, and C) the button is released to the home position thereby protruding through the hole in one of the plurality of sides.

8. The accessory mounting device according to claim 7, further comprising:

a first cleat portion in the open and hollow recess; and a second cleat portion formed on the mounting tab of the collet configured to engage the first cleat portion thereby preventing downward motion of the accessory hub once engaged and further securing the accessory hub to the collet.

9. The accessory mounting device according to claim 8, wherein the accessory hub is retained by the collet to the wall when A) the button is depressed to the displaced position, B) the first cleat portion is engaged with the second cleat portion, and C) the button is released to the home position thereby protruding through the hole in one of the plurality of sides.

10. The accessory mounting device according to claim 6, wherein the bore and the spring retainer are each threaded with a complimentary thread, thereby allowing the spring retainer to engage and be retained with the bore.

11. The accessory mounting device according to claim 6, wherein the accessory hub is configured to receive a plurality of accessories including at least one of a towel bar, a towel ring, a soap tray, a tissue holder, a tumbler holder, and a robe hook, and wherein the accessory hub is interchangeable with any one of the accessories.

12. An accessory mounting device comprising:

an accessory hub with a plurality of sides and a rear portion;

an open and hollow recess in the rear portion, wherein the open and hollow recess includes a first cleat portion for securing the accessory hub to a wall;

a collet with a first mounting tab received in the open and hollow recess;

a second cleat portion formed on the first mounting tab of the collet configured to engage the first cleat portion thereby preventing downward motion of the accessory hub once engaged;

a button within the collet displaceable to a home position and a displaced position;

a bore forming a blind hole in the collet configured to receive the button;

a spring within the bore configured to urge the button from the displaced position back to the home position;

a spring retainer fastened to the bore with a threaded engagement configured to retain the spring and button within the bore; and a hole in one of the plurality of sides of the accessory hub, wherein the button is at least partially accessible through the hole;

wherein the accessory hub is removed from the collet by depressing the button and disengaging the first cleat portion from the second cleat portion, and wherein the accessory hub is retained by the collet when the button is depressed to the displaced position, the first cleat portion is engaged with the second cleat portion, and the button is released to the home position thereby protruding through the hole in one of the plurality of sides.

13. The accessory mounting device according to claim 12, wherein the button is configured to be displaced from the home position to the displaced position with a manual depression and automatically returned to the home position following termination of the manual depression.

14. The accessory mounting device according to claim 12, wherein the accessory hub is configured to receive a plurality of accessories including at least one of a towel bar, a towel ring, a soap tray, a tissue holder, a tumbler holder, and a robe hook, and wherein the accessory hub is interchangeable with any one of the accessories.

15. The accessory mounting device according to claim 12, wherein the first cleat portion and the second cleat portion form a French cleat when joined together.

16. The accessory mounting device according to claim 15, wherein the French cleat prevents the accessory hub from moving in a downward direction and the button prevents removal of the accessory hub from the collet when in the home position.

17. The accessory mounting device according to claim 12, wherein the collet is affixed to a wall with fasteners and the accessory hub attaches to the collet with the button and the first and second cleat portions.

* * * * *